United States Patent
Cho et al.

(10) Patent No.: US 8,173,303 B2
(45) Date of Patent: May 8, 2012

(54) LITHIUM SECONDARY BATTERY

(75) Inventors: Chung-Kun Cho, Suwon-si (KR);
Sang-Mock Lee, Yongin-si (KR);
Young-Gyoon Ryu, Suwon-si (KR);
Seung-Sik Hwang, Suwon-si (KR);
Jea-Woan Lee, Suwon-si (KR);
Yoshiaki Nitta, Suwon-si (KR);
Joon-Sup Kim, Suwon-si (KR);
Sung-Soo Kim, Suwon-si (KR); Jae-Gu Yoon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 2240 days.

(21) Appl. No.: 11/115,529

(22) Filed: Apr. 26, 2005

(65) Prior Publication Data
US 2005/0244715 A1    Nov. 3, 2005

(30) Foreign Application Priority Data

Apr. 29, 2004 (KR) .......................... 10-2004-0029968

(51) Int. Cl.
*H01M 4/13* (2010.01)

(52) U.S. Cl. ................... 429/231.9; 429/209; 429/218.1
(58) Field of Classification Search ........................ None
See application file for complete search history.

(56) References Cited

U.S. PATENT DOCUMENTS

| | | | |
|---|---|---|---|
| 5,948,569 A | 9/1999 | Moses et al. | |
| 6,599,662 B1 * | 7/2003 | Chiang et al. | 429/218.1 |
| 6,706,447 B2 | 3/2004 | Gao et al. | |
| 2002/0119373 A1 | 8/2002 | Gao et al. | |

FOREIGN PATENT DOCUMENTS

| | | |
|---|---|---|
| JP | 03-196467 A | 8/1991 |
| JP | 11-120993 A | 4/1999 |
| KR | 2002-0093536 | 12/2002 |
| KR | 2003-0033913 | 5/2003 |

OTHER PUBLICATIONS

Korean Patent Abstracts for Publication No. 1020030033913; Date of publication of application May 1, 2003, in the name of Dong Gi Ahn et al.
Korean Patent Abstracts for Publication No. 1020020093536; Date of publication of application Dec. 16, 2002, in the name of Byeong Won Cho et al.

* cited by examiner

*Primary Examiner* — Cynthia Lee
(74) *Attorney, Agent, or Firm* — Christie, Parker & Hale, LLP

(57) ABSTRACT

Disclosed is a lithium secondary battery including a positive electrode including a positive active material; a negative electrode including a negative active material; a separator interposed between the positive and negative electrodes; and an electrolyte, where an alkaline metal powder layer is formed by dispersion coating on a surface of at least one of the positive and negative electrodes and the separator.

12 Claims, 1 Drawing Sheet

LITHIUM SECONDARY BATTERY

CROSS REFERENCE TO RELATED APPLICATION

This application claims priority to and the benefit of Korean Patent Application No. 10-2004-0029968, filed on Apr. 29, 2004 in the Korean Intellectual Property Office, the entire content of which is incorporated herein by reference.

FIELD OF THE INVENTION

The present invention relates to a lithium secondary battery, and more particularly to a lithium secondary battery with reduced initial irreversible capacity and improved energy density.

BACKGROUND OF THE INVENTION

A lithium secondary battery uses materials that are capable of reversibly intercalating and deintercalating lithium ions in positive and negative electrodes. A lithium secondary battery is fabricated by filling an organic electrolyte or polymer electrolyte between the positive and negative electrodes. Electrical energy is generated by an oxidation-reduction reaction during intercalation/deintercalation of lithium ions in the positive and negative electrodes.

Positive active materials include chalcogenide compounds, and examples thereof include $LiCoO_2$, $LiMn_2O_4$, $LiNiO_2$, $LiNi_{1-x}Co_xO_2$ (where $0<x<1$), and $LiMnO_2$.

For negative active materials for a lithium secondary battery, lithium metal has been used, but lithium metal tends to form dendrites which can result in explosions from short circuits. Therefore, carbonaceous materials such as amorphous carbon or crystalline carbon are often used instead of lithium metal. However, the use of carbonaceous material manifests an irreversible capacity loss of 5% to 30% for the first initial several cycles. Such an irreversible capacity consumes lithium ions, and renders charge or discharge of certain of the active material particles impossible, resulting in a deterioration of energy density of the battery.

Further, such irreversible capacity problems are severely manifested on a negative active material such as Si, Sn, and the like, which have been recently studied for high capacity negative active materials.

In order to solve the above problems, U.S. Pat. No. 5,948,569 discloses that a Group 1 element of the Periodic Table may be deposited on a separator or electrode using vacuum deposition such as evaporation or sputtering to place the Group 1 element between positive and negative electrodes. However, as this method uses a deposition process, the equipment costs are very high and repair thereof is difficult. Furthermore, after the separator or electrodes are placed in a vacuum chamber, it takes a long time to develop a vacuum, making the manufacturing speed slow. Additionally, the Group 1 element, especially lithium metal, is deposited in the vacuum chamber during the deposition and should be removed periodically. However, the removal raises safety concerns because Group 1 elements have high reactivity.

U.S. Pat. No. 6,706,447 discloses a method for preparing a negative electrode by uniformly mixing a lithium metal powder and active material uniformly. However, because of the differences in density between the lithium metal and the active material, uniformity may not be obtained during slurry preparation, coating on a current collector, and the drying processes. Further, pores are generated after the lithium metal powders are dissolved during initial charge-discharge, and the pores cause a change in the electrode resulting in deterioration of both cycle life and reliability of the battery.

SUMMARY OF THE INVENTION

According to one embodiment of the present invention, a lithium secondary battery is prepared through a simple and economical process with good safety and improved capacity and cycle life.

Another embodiment of the present invention provides a lithium secondary battery including a positive electrode including a positive active material, a negative electrode including a negative active material, a separator interposed between the positive and negative electrodes, and an electrolyte. An alkaline metal powder layer is formed by dispersion coating on a surface of at least one of the positive and negative electrodes and the separator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
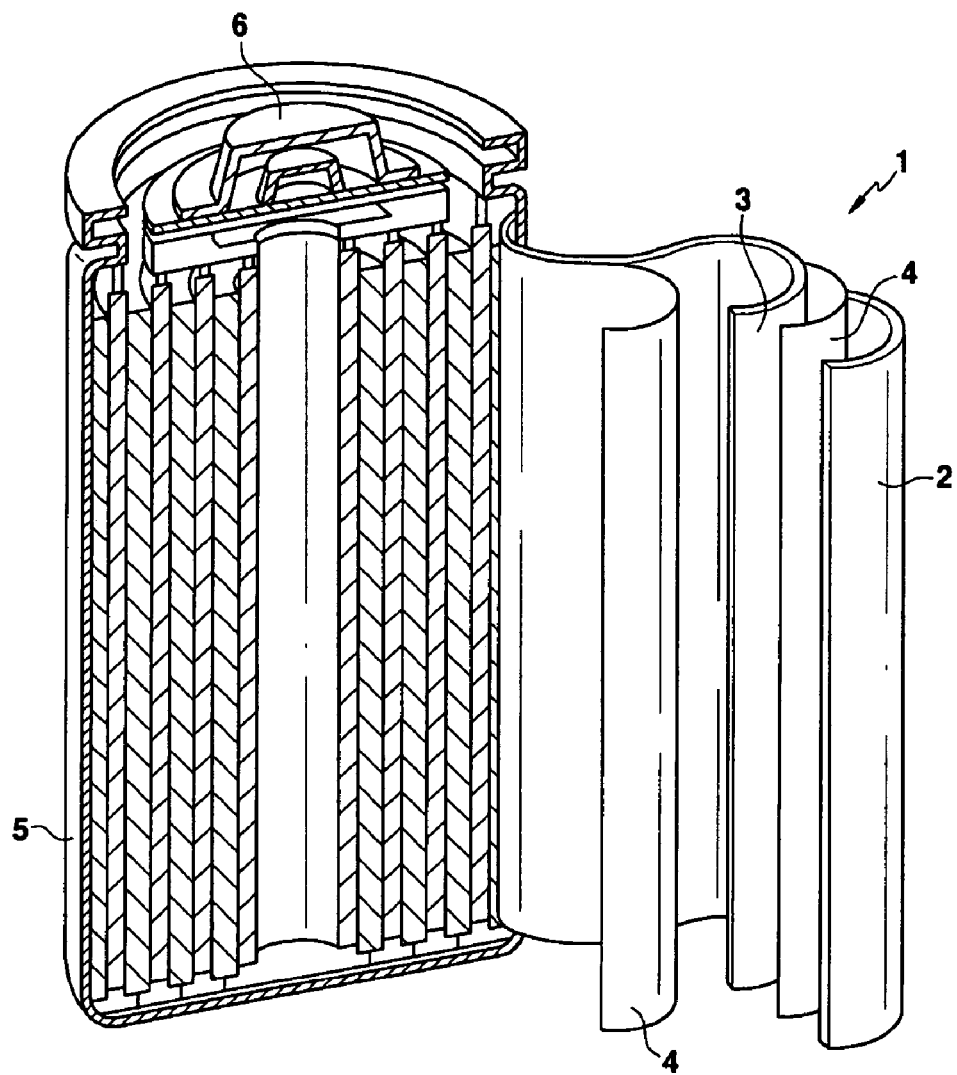
FIG. 1 is a schematic view of a lithium secondary battery.

In a lithium secondary battery, efficiency may be decreased due to initial irreversible capacity of active materials during charge-discharge. In the present invention, alkaline metal powders prevent such a decrease of efficiency, or they may act as a lithium ion source for a battery using a lithium-free active material such as $V_2O_5$. The alkaline metal powder is formed on the surface of at least one of the positive and negative electrodes and the separator using a general coating process to provide a lithium secondary battery having reduced initial irreversible capacity and good energy density.

The lithium secondary battery includes a positive electrode including a positive active material, a negative electrode including a negative active material, a separator interposed between the positive and negative electrodes and an electrolyte. An alkaline metal powder layer is formed by dispersion coating on a surface of at least one of the positive and negative electrodes and the separator.

Examples of the alkaline metal are Li, Na or K, and preferably Li. In order to reduce its reactivity with the solvent or electrolyte, carbon dioxide, hydrofluoric acid, sulfur, or a small amount of water may be added during the preparation of the alkaline metal powder. Alternatively, the alkaline metal may be coated with a polymer. The coating process is performed through the following steps: preparing a polymer liquid by adding a polymer to a suitable solvent, dipping the alkaline metal into the polymer liquid, separating it from the polymer liquid, and drying it. Examples of suitable polymers include poly(ethylene oxide), polyvinylidene fluoride, polytetrafluoroethylene, copolymers of polyvinylidene fluoride and hexafluoropropylene, polyurethane, or polyacrylate.

The alkaline metal powder layer may be formed to a thickness sufficient to supplement the lithium ions consumed due to the irreversibility of the negative active material. Where a positive active material without lithium is used, the alkaline metal powder layer may be formed in a thickness to provide lithium ions corresponding to the capacity of a positive active material. The thickness of the alkaline metal powder layer is less than or equal to 30 μm, preferably less than or equal to 20

μm, more preferably less than or equal to 10 μm, and most preferably less than or equal to 5 μm. When the thickness of the alkaline metal powder layer is over 30 μm, the interval between the electrode and separator is too large during charge-discharge, resulting in the deterioration of the cycle life characteristics.

The alkaline metal powder layer is formed by the following process: an alkaline metal composition is prepared by adding an alkaline metal powder to a solvent; the composition is coated on the surface of the electrode or separator; and dried. The coating process may be performed through general liquid coating techniques. Examples of liquid coating techniques include knife coating, direct roll coating, reverse roll coating, gravure roll coating, gap coating, spray coating, slot die coating or tape casting.

Since the alkaline metal powder layer is formed using liquid coating rather than a deposition process, the resultant alkaline metal powder layer includes many pores. Thus, injected electrolyte can saturate quickly because it is absorbed into the electrode easily. Therefore, capacity and cycle life characteristics can be improved.

The alkaline metal powder particles have an average size ranging from 1 to 100 μm, preferably from 5 to 50 μm, and more preferably from 10 to 20 μm.

When the average size of the particles is greater than 100 μm, the coating layer is so thick that it reduces the energy density and the interval between the separator and electrode is too large during charge-discharge so that it reduces cycle life characteristics. When the average size of the particles is less than 1 μm, it is difficult to handle the alkaline metal.

The alkaline metal composition includes the alkaline metal at a concentration to sufficiently improve the irreversible capacity of the positive and negative active materials. Where a positive active material excluding lithium is used, the alkaline metal should be present at a concentration to react with the positive active metal and intercalate in the positive active material completely. The amount of the alkaline metal to accomplish the above requirements may be attained by dividing irreversible capacity by a theoretical capacity of alkaline metal. In light of the above calculation, the concentration of the alkaline metal is preferably 1 to 30 parts by weight, and more preferably 3 to 20 parts by weight based on 100 parts by weight of solvent. When the amount of the alkaline metal is less than 1 part by weight, the effect of alkaline metal addition such as improvement of capacity and safety is not shown. When the amount of the alkaline metal is greater than 30 parts by weight, the alkaline metal occupies excessive space inside the battery and tends to form dendrite.

Any solvent that has a low boiling point for removal, has low reactivity with an alkaline metal, and does not leave residues after drying may be used. Examples are acetonitrile, acetone, tetrahydrofuran, dimethyl formamide, N-methyl pyrrolidinone, and so on.

The temperature at drying should not exceed the melting point of the alkaline metal. For example, when the alkaline metal is lithium, the temperature should not be greater than 180° C. In order to remove the solvent completely, the drying process may be performed in a vacuum. A dried alkaline metal powder layer that is coated on the electrode or separator has good malleability and adhesive force. In order to make the alkaline metal powder layer dense or uniform and increase the adhesive force with the electrode or separator, compression may be performed after the drying process. The compression pressure is preferably 10 gf/cm² to 500 kgf/cm². When the pressure is less than 10 gf/cm², compression is not sufficient, whereas when the pressure is greater than 100 kgf/cm², damage to the separator and lithium metal layer may occur. Such compression reduces the thickness of the powder layer and reduces the interval between the separator and electrodes after charge-discharge, resulting in improvement of the cycle life characteristics.

A polymer binder may be added to the alkaline metal composition to make the coating process easier and improve adhesive force. Examples of binders include polytetrafluoroethylene, polyvinylidene fluoride, a copolymer of polyvinylidene fluoride and hexafluoropropylene, and styrene-butadiene rubber. The polymer binder may be provided in the amount of 1 to 20 parts by weight based on 100 parts by weights of solvent. When the polymer binder is used in an amount less than 1 part by weight, coating is difficult due to insufficient viscosity, and when the polymer binder is used in an amount greater than 20 parts by weight, the viscosity is too high. When the alkaline metal powder layer is formed on an electrode by adding the polymer binder, the amount of binder that remains on the surface of the electrode is generally greater than the amount of the binder used in a slurry composition for fabricating an electrode after charge-discharge. This is because the alkaline metal of the alkaline metal powder layer supplements the irreversible capacity and disappears from the surface of the electrode, leaving only binder components. Resultantly, the amount of binder on the surface of the electrode is reduced to about 30 wt %. In this specification, the "surface" of the electrode means a depth of up to about 1 μm from the outside surface.

In addition, both the compression and addition of binder polymer may be performed, which are well understood in the related arts.

Figure 2:
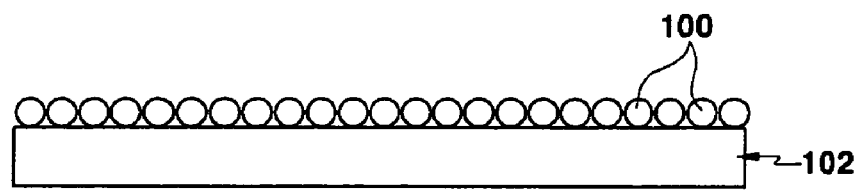
FIG. 2 is a sectional view of an electrode or separator that is coated with alkaline metal powder.

The alkaline metal powder layer may be formed on at least one of the positive electrode, the negative electrode, and the separator, and thus may be present between the separator and the positive electrode or the separator and the negative electrode. FIG. 2 shows an alkaline metal powder layer 100 that is present on the surface of the electrode or separator 102. When the alkaline metal powder layer is provided on the positive or negative electrodes, it is provided on the surface of the positive active material layer or negative active material layer facing the current collector.

Positive active materials include lithiated intercalation compounds that are capable of reversible electrochemical oxidation/reduction, and inorganic sulfur ($S_8$) or sulfur-based compounds that are commonly used in lithium sulfur batteries.

Examples of the lithiated intercalation compound are compounds of chemical formulas 1 to 14:

$$LiAO_2 \tag{1}$$

$$LiMn_2O_4 \tag{2}$$

$$Li_aNi_bB_cM_dO_2 \tag{3}$$

(where $0.95 \leq a \leq 1.1$, $0 \leq b \leq 0.9$, $0 \leq c \leq 0.5$, $0.001 \leq d \leq 0.1$)

$$Li_aNi_bCo_cMn_dM_eO_2 \tag{4}$$

(where $0.95 \leq a \leq 1.1$, $0 \leq b \leq 0.9$, $0 \leq c \leq 0.5$, $0 \leq d \leq 0.5$, $0.001 \leq e \leq 0.1$)

$$Li_aAM_bO_2 \tag{5}$$

(where $0.95 \leq a \leq 1.1$, $0.001 \leq b \leq 0.1$)

$$Li_aMn_2M_bO_4 \tag{6}$$

(where $0.95 \leq a \leq 1.1$, $0.001 \leq b \leq 0.1$)

$$DX_2 \tag{7}$$

$$LiDS_2 \tag{8}$$

$$V_2O_5 \tag{9}$$

$$LiV_2O_5 \tag{10}$$

$LiEO_2$ (11)

$LiNiVO_4$ (12)

$Li_{(3-x)}F_2(PO_4)_3$ (where $0 \leq x \leq 3$) (13)

$Li_{(3-x)}Fe_2(PO_4)_3$ (where $0 \leq x \leq 2$) (14)

where: A is selected from the group consisting of Co, Ni and Mn; B is Co or Mn; D is Ti, Mo, or Mn; E is selected from the group consisting of Cr, V, Fe, Sc and Y; F is selected from the group consisting of V, Cr, Mn, Co, Ni and Cu; M is at least one transition metal or lanthanide selected from the group consisting of Al, Cr, Mn, Fe, Mg, La, Ce, Sr and V; and X is O or S.

The sulfur-based compound includes a compound selected from the group consisting of $Li_2S_n$ (where $n \geq 1$), organo sulfur compounds and carbon-sulfur polymers $((C_2S_x)_n$ (where x=2.5 to 50, and $n \geq 2$)).

The negative electrode may be made from a negative active material such as a carbonaceous material, Si, Sn, tin oxide, a composite tin alloy, a transition metal oxide, a lithium metal nitride, or a lithium metal oxide, and preferably is a carbonaceous material, and more preferably is graphite or carbon black.

Suitable separators include polyethylene separators, polypropylene separators, polyethylene/polypropylene two-layered separators, polyethylene/polypropylene/polyethylene three-layered separators, or polypropylene/polyethylene/polypropylene three-layered separators.

The electrolyte of the lithium secondary battery includes a non-aqueous organic solvent and a lithium salt.

The aforementioned lithium salt, dissolved in the organic solvent, not only basically makes a lithium secondary battery function as an ion source inside the battery, but it also promotes the movement of ions between the positive and negative electrodes. The lithium salt includes one or two supporting electrolytic salts selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_xF_{2y+1}SO_2)$ (where x are y are natural numbers), LiCl, and LiI. A suitable concentration of the lithium salt is in the range of 0.1M to 2.0M. When the lithium salt concentration is less than 0.1M, the conductivity of the electrolyte decreases and thus the performance of the electrolyte is deteriorated. When the concentration of the lithium salt is greater than 2.0 M, lithium ion mobility decreases due to an increase of the electrolyte viscosity.

The aforementioned non-aqueous organic solvent plays a role of helping the movement of ions in the electrochemical reaction, and suitable solvents include one or more solvents selected from the group consisting of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a C2 to C50 linear, branched, or cyclic hydrocarbon and may include a double bond, an aromatic ring, or an ether group), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalolactone. When a mixture of more than one of the aforementioned organic solvents is used, the mixing ratio can be appropriately regulated depending on the intended battery performance, as is well understood to one of ordinary skill in the related arts.

FIG. 1 shows one embodiment of a lithium secondary battery constructed as illustrated above. A lithium secondary battery of the present invention shown in FIG. 1 includes a negative electrode 2; a positive electrode 3; a separator 4 interposed between the negative electrode 2 and positive electrode 3; and an electrolyte impregnated in the negative electrode 2, the positive electrode 3, and the separator 4; a cylindrical container 5; and a sealing member 6 to seal the container 5. FIG. 1 illustrates the structure of a cylindrical type of battery, but the present invention is not limited thereto, as it could be any shape such as a prismatic or a pouch battery.

The following examples illustrate the present invention in further detail. However, it is understood that the present invention is not limited by these examples.

Example 1

94 wt % of $LiCoO_2$ as a positive active material, 3 wt % of Super P as a conductive agent, and 3 wt % of polyvinylidene fluoride (PVdF) as a binder were mixed in N-methyl-2-pyrrolidone (NMP) to prepare a positive active material slurry. The $LiCoO_2$ positive active material was an active material showing a charge capacity of 160 mAh/g when initially charged at 0.1 C to a voltage of 4.3V and a discharge capacity of 157 mAg/g when discharged to 3.0V.

The positive active material slurry was coated on an Al-foil current collector and dried to form a positive active material layer on the current collector. On the positive active material layer, a lithium metal composition was coated and dried at 110° C. to fabricate a positive electrode having a lithium metal powder layer 7 μm thick. The lithium metal composition was prepared by adding 10 parts by weight of lithium metal having an average particle size of about 5 μm to 100 parts by weight of tetrahydrofuran solvent. The amount of the lithium metal to be added was calculated by dividing the irreversible capacity of the negative active material by theoretical capacity.

90 wt % of graphite having an initial capacity of 370 mAh/g and a reversible capacity of 350 mAh/g and 10 wt % of polyvinylidene fluoride (PVdF) as a binder were mixed in N-methyl-2-pyrrolidone (NMP) to prepare a negative active material slurry. The negative active material slurry was coated on a Cu-foil current collector and dried to fabricate a negative electrode.

A polyethylene polymer separator was interposed between the positive and negative electrodes. The N/P ratio, which is the amount of negative active material relative to capacity of a positive electrode on the basis of reversible capacity was regulated to be 1:1.2 to fabricate a lithium secondary battery cell. As an electrolyte, 1M $LiPF_6$ dissolved in a mixed solvent of ethylene carbonate, dimethyl carbonate, ethylmethyl carbonate and fluorobenzene in a volume ratio of 3:5:1:1 was used.

Example 2

A lithium secondary battery cell was fabricated by the same method as Example 1, except that the positive active material slurry prepared by the procedure of Example 1 was coated on an Al foil current collector to fabricate a positive electrode, and after the negative active material slurry was coated on a Cu-foil to form a negative active material layer, the lithium metal composition was coated thereon and dried at 110° C. to fabricate a negative electrode.

Example 3

A lithium secondary battery cell was fabricated by the same method as Example 1, except that the positive active material slurry prepared by the procedure of Example 1 was coated on an Al foil current collector to fabricate a positive electrode, and the lithium metal composition was coated on the polyethylene ethylene polymer film and dried at 60° C. to fabricate a separator having a lithium metal powder layer. The lithium metal powder layer was adjacent to the surface of the positive electrode.

Example 4

A lithium secondary battery cell was fabricated by the same method as Example 1, except that the positive active material slurry prepared by the procedure of Example 1 was coated on an Al foil current collector to fabricate a positive electrode, and the lithium metal composition was coated on the polyethylene ethylene polymer film and dried at 60° C. to fabricate a separator having a lithium metal powder layer. The lithium metal powder layer was adjacent to the surface of the negative electrode.

Comparative Example 1

A lithium secondary battery cell was fabricated by the same method as Example 1, except that the positive active material slurry prepared by the procedure of Example 1 was coated on an Al foil current collector to fabricate a positive electrode.

Five battery cells were fabricated for each of Examples 1 to 4 and Comparative Example 1, and evaluated for penetration at overcharge. The results are shown in Table 1.

TABLE 1

|  | Example 1 | Example 2 | Example 3 | Example 4 | Comparative Example 1 |
|---|---|---|---|---|---|
| Amount of positive active material (g) | 4.459 | 4.458 | 4.458 | 4.457 | 4.827 |
| Amount of negative active material (g) | 2.200 | 2.200 | 2.200 | 2.200 | 2.200 |
| $1^{st}$ charge (mAh/g) | 814 | 713 | 812 | 714 | 814 |
| $1^{st}$ discharge (mAh/g) | 700.063 | 701 | 699 | 700 | 700 |
| $2^{nd}$ charge (mAh/g) | 701 | 700 | 699 | 700 | 700 |
| $2^{nd}$ discharge (mAh/g) | 700 | 700 | 700 | 700 | 700 |
| Penetration at overcharge* | 5L0 | 5L0 | 5L0 | 5L0 | 5L3 |

*the "Penetration at overcharge" terms are defined as follows:
L0: no change,
L1: leak,
L2: smoke,
L3: heat emission at less than or equal to 200° C.,
L4: heat emission at more than 200° C.,
L5: explosion.

As shown in Table 1, battery cells according to Examples 1 to 4 used less positive active material than those of Comparative Example 1, while they showed charge-discharge capacity approximately equivalent to or slightly greater than Comparative Example 1. The battery cells according to Examples 1 to 4 include a lithium metal powder layer, and thus, reduce the irreversible capacity of the negative electrode resulting in improved capacity.

In Table 1, since 5L0 means that five battery cells showed no change during penetration at overcharge, the result indicates that battery cells according to Examples 1 to 4 satisfied the penetration requirements and are safe. On the contrary, five battery cells according to Comparative Example 1 combusted at the temperature of less than or equal to 200° C. indicating a lower level of safety. As described above, battery cells according to Examples 1 to 4 have improved safety over those of Comparative Example 1. The above results were due to the inclusion of a lithium metal powder layer as set forth in Examples 1 to 4 which decreases irreversible capacity, and thus a necessary amount of the active material is available so as to obtain equal capacity compared with Comparative Example 1.

As described above, a lithium secondary battery includes an alkaline metal powder layer formed by liquid coating through a simple and economical process and thus it has good safety and improved capacity and cycle life characteristics.

What is claimed is:

1. A lithium secondary battery comprising:
   a positive electrode comprising a positive active material;
   a negative electrode comprising a negative active material;
   a separator interposed between the positive and negative electrodes; an electrolyte; and
   a dispersion-coated porous alkaline metal powder layer on a surface of at least one of the positive electrode, the negative electrode, or the separator.

2. The lithium secondary battery of claim 1, wherein the alkaline metal is selected from the group consisting of Li, Na, and K.

3. The lithium secondary battery of claim 2, wherein the alkaline metal is Li.

4. A lithium secondary battery comprising:
   a positive electrode comprising a positive active material;
   a negative electrode comprising a negative active material;
   a separator interposed between the positive and negative electrodes;
   an electrolyte; and
   a dispersion-coated porous alkaline metal powder layer having a thickness less than or equal to 30 μm on a surface of at least one of the positive electrode, the negative electrode, or the separator.

5. The lithium secondary battery of claim 4, wherein the alkaline metal powder layer has a thickness less than or equal to 20 μm.

6. The lithium secondary battery of claim 5, wherein the alkaline metal powder layer has a thickness less than or equal to 10 μm.

7. The lithium secondary battery of claim 6, wherein the alkaline metal powder layer has a thickness of less than or equal to 5 μm.

8. The lithium secondary battery of claim 1, wherein the positive active material comprises at least one compound selected from the group consisting of lithiated intercalation compounds, elemental sulfur ($S_8$), and sulfur-based compounds.

9. The lithium secondary battery of claim 1, wherein the negative active material comprises a material selected from the group consisting of carbonaceous materials, Si, Sn, tin oxide, composite tin alloys, transition metal oxides, lithium metal nitrides, lithium metal oxides, and combinations thereof.

10. The lithium secondary battery of claim 1, wherein the alkaline metal powder has an average particle size ranging from 1 to 100 μm.

11. The lithium secondary battery of claim 1, wherein the alkaline metal powder has an average particle size ranging from 5 to 50 μm.

12. The lithium secondary battery of claim 1, wherein the alkaline metal powder has an average particle size ranging from 10 to 20 μm.

* * * * *